United States Patent
Peretz (10) Patent No.: US 10,994,585 B2
(45) Date of Patent: May 4, 2021

(54) VEHICLE AIR-CONDITIONING SYSTEM

(71) Applicant: Oren Peretz, Berekhya (IL)

(72) Inventor: Oren Peretz, Berekhya (IL)

(*) Notice: Subject to any disclaimer, the term of this patent is extended or adjusted under 35 U.S.C. 154(b) by 325 days.

(21) Appl. No.: 16/030,900

(22) Filed: Jul. 10, 2018

(65) Prior Publication Data
US 2019/0016193 A1   Jan. 17, 2019

Related U.S. Application Data (60) Provisional application No. 62/531,364, filed on Jul. 12, 2017.

(51) Int. Cl.
*B60H 1/00*    (2006.01)
*B60H 1/32*    (2006.01)

(52) U.S. Cl.
CPC ......... *B60H 1/00778* (2013.01); *B60H 1/004* (2013.01); *B60H 1/00428* (2013.01); *B60H 1/3208* (2013.01); *B60H 1/3222* (2013.01); *B60H 2001/3294* (2013.01)

(58) Field of Classification Search
None
See application file for complete search history.

(56) References Cited

U.S. PATENT DOCUMENTS

| | | | |
|---|---|---|---|
| 2016/0258409 A1* | 9/2016 | Marthaler | F02N 15/08 |
| 2018/0162371 A1* | 6/2018 | Colavincenzo | B60L 50/16 |

* cited by examiner

*Primary Examiner* — Colby M Hansen
(74) *Attorney, Agent, or Firm* — Arent Fox LLP (57) ABSTRACT

A vehicle air-conditioning system, including: a DC-to-AC inverter, for supplying alternating current to the alternator of the vehicle from a battery, for rotating the wheel of the alternator; mechanical connection between the alternator wheel and a wheel of the air-conditioner of the vehicle; and an operating element, for user-operating the DC-to-AC inverter and the clutch of the mechanical connection, thereby operating the air-conditioner without power of the engine wheel.

7 Claims, 8 Drawing Sheets

VEHICLE AIR-CONDITIONING SYSTEM

CROSS-REFERENCE TO RELATED APPLICATIONS

This application claims the benefit of priority from U.S. Provisional Application No. 62/531,364, filed Jul. 12, 2017, the disclosure of which is incorporated herein by reference.

TECHNICAL FIELD

The invention relates to the field of air conditioning for vehicles.

BACKGROUND

Figure 1:
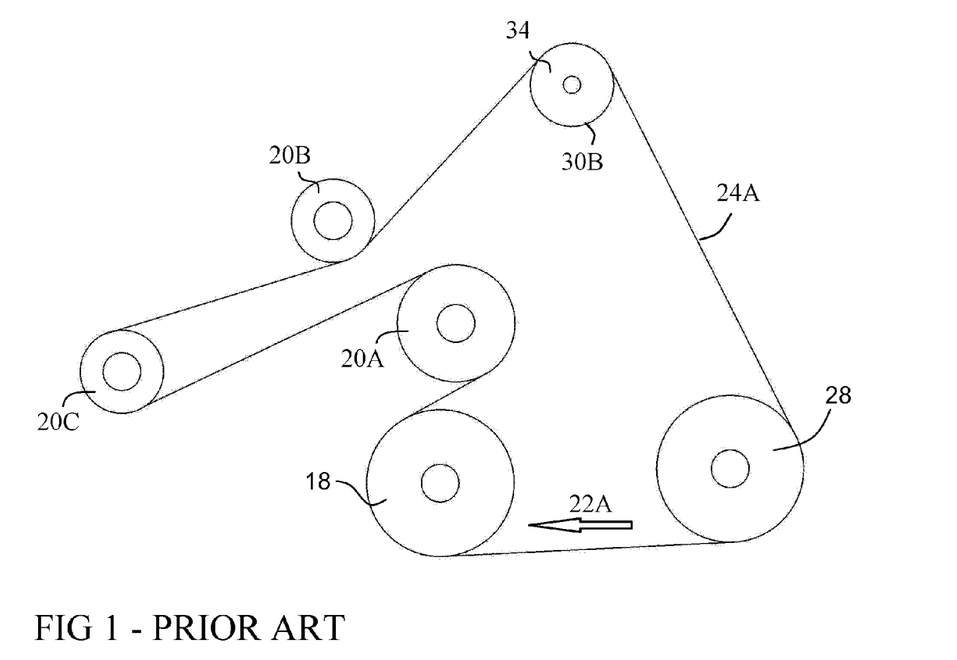
FIG. 1 is a sketch of the elements receiving the power transmission in a prior art vehicle.

FIG. 1 is a sketch of the elements receiving the power transmission in a prior art vehicle.

The vehicle's engine wheel 18 transmits its torque by a belt 24A or other means moving along rotational direction 22A, to a wheel 30B of an alternator 34, for producing alternating electric power (shown in FIG. 2); and to an air-conditioner wheel 28, for operating the air-conditioner, for cooling the passenger's compartment (not shown).

Figure 2:
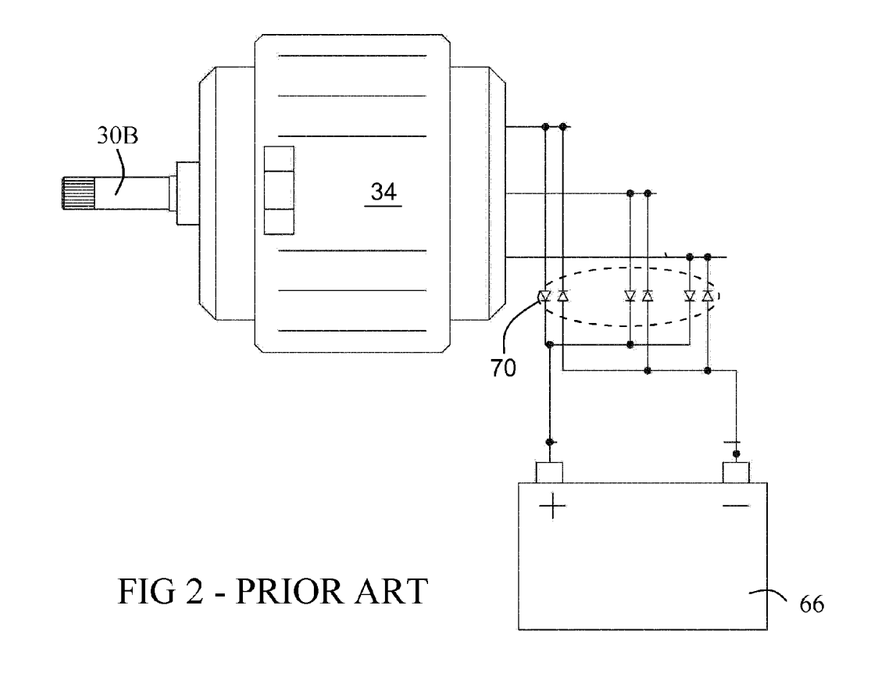
FIG. 2 is a prior art electrical circuitry of the alternator of FIG. 1.

FIG. 2 is a prior art electrical circuitry of the alternator of FIG. 1.

Rotation of wheel 30B of alternator 34 produces alternating voltage (such as of three phase), being rectified to direct current (DC) supplied to the vehicle's battery 66.

However, activating the air-conditioner is not available without operating the engine, while operation of the engine without being at the site is regarded dangerous to the public and to the vehicle.

There is a long felt need to provide a solution to the above-mentioned and other problems of the prior art.

SUMMARY

A vehicle air-conditioning system, including a DC-to-AC inverter, for rotating the alternator wheel, and mechanical connection between the alternator wheel and the air-conditioner wheel, thereby allowing operating the air-conditioner separated from the engine.

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 3:
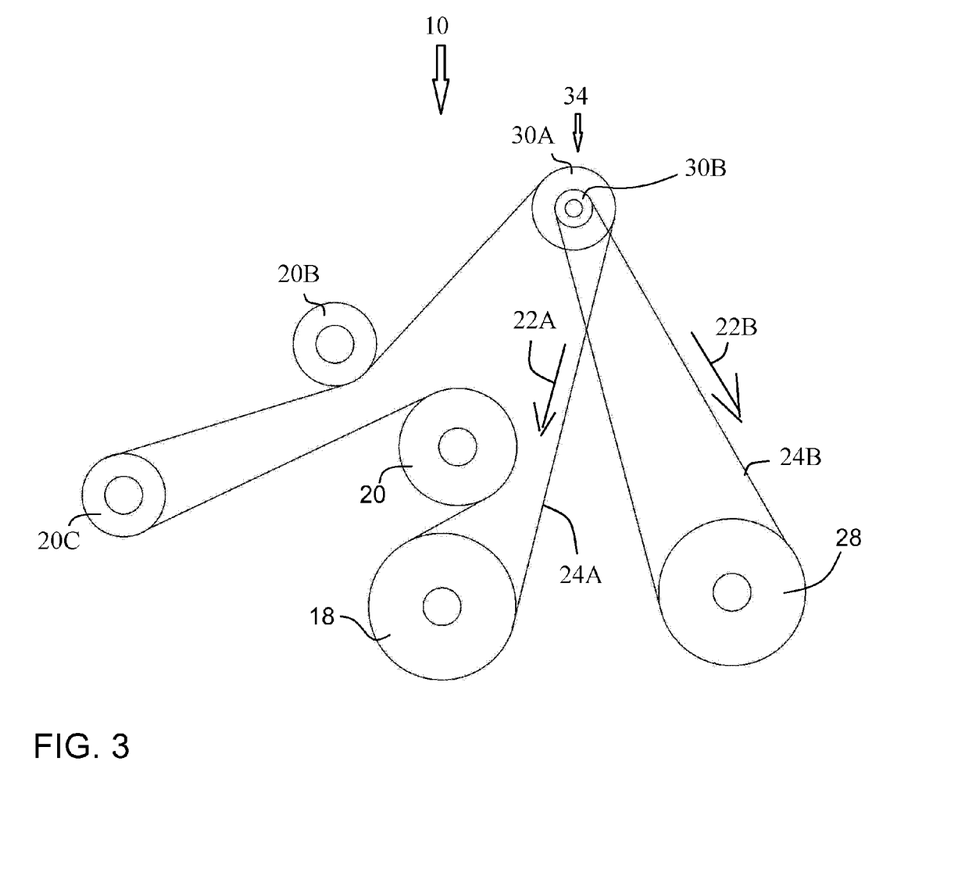
FIG. 3 is a sketch of the elements receiving the power transmission in a vehicle according to one embodiment of the invention.

FIG. 3 is a sketch of the elements receiving the power transmission in a vehicle according to one embodiment of the invention.

Figure 6:
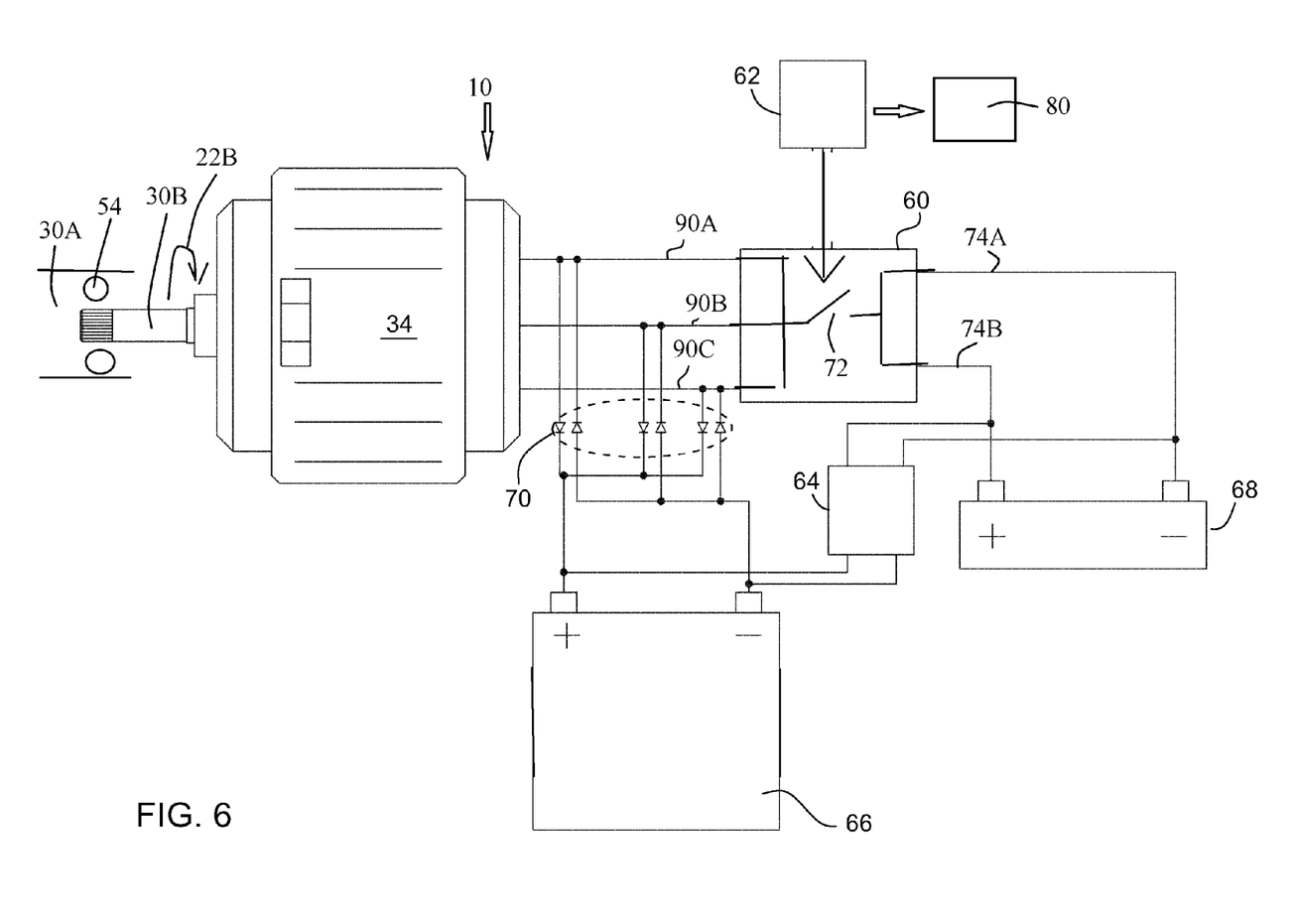
FIG. 6 depicts the electrical circuitry of the alternator of FIG. 3.

According to one embodiment of the invention, engine wheel 18 transmits its torque by belt 24A or other means moving along rotational direction 22A, to a wheel 30A, for transferring it to wheel 30B of alternator 34, for producing electric power (shown in FIG. 6).

In contrast to the prior art vehicle, air-conditioner wheel 28 directly receives its torque from wheel 30B of alternator 34 through a belt 24B along rotational direction 22B.

Figure 4:
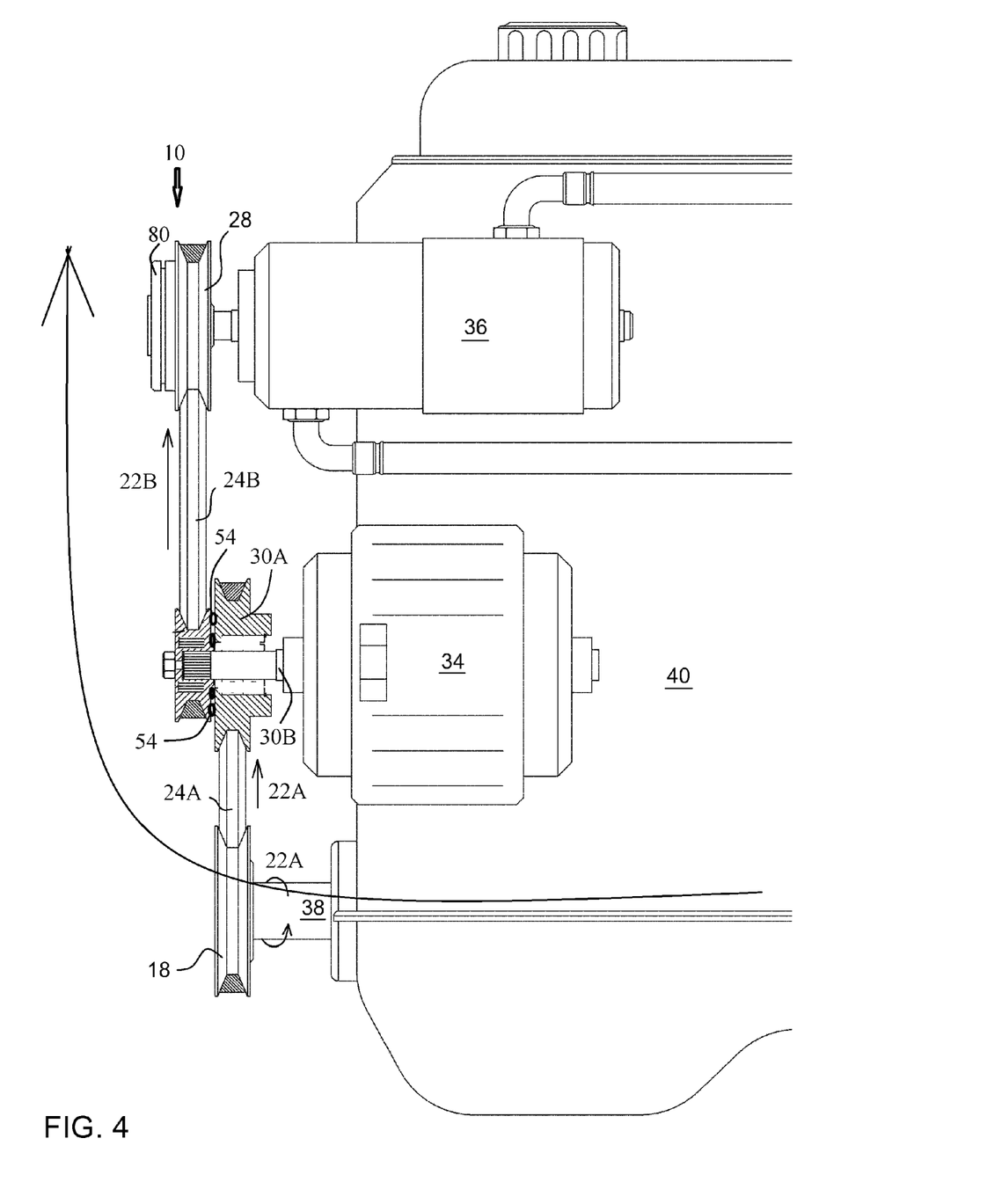
FIG. 4 is a front view of the elements of FIG. 3, for depicting the torque transfer therebetween, in case the source of the power is the engine wheel.

FIG. 4 is a front view of the elements of FIG. 3, for depicting the torque transfer therebetween, in case the source of the power is the engine wheel.

Engine wheel 18 transmits its torque by belt 24A or other means moving along rotational direction 22A, to wheel 30A.

Wheel 30B of alternator 34 and wheel 30A are connected one to the other through a one-directional bearing 54, providing that rotation of wheel 30A along rotational direction 22A rotates wheel 30B.

Figure 5:
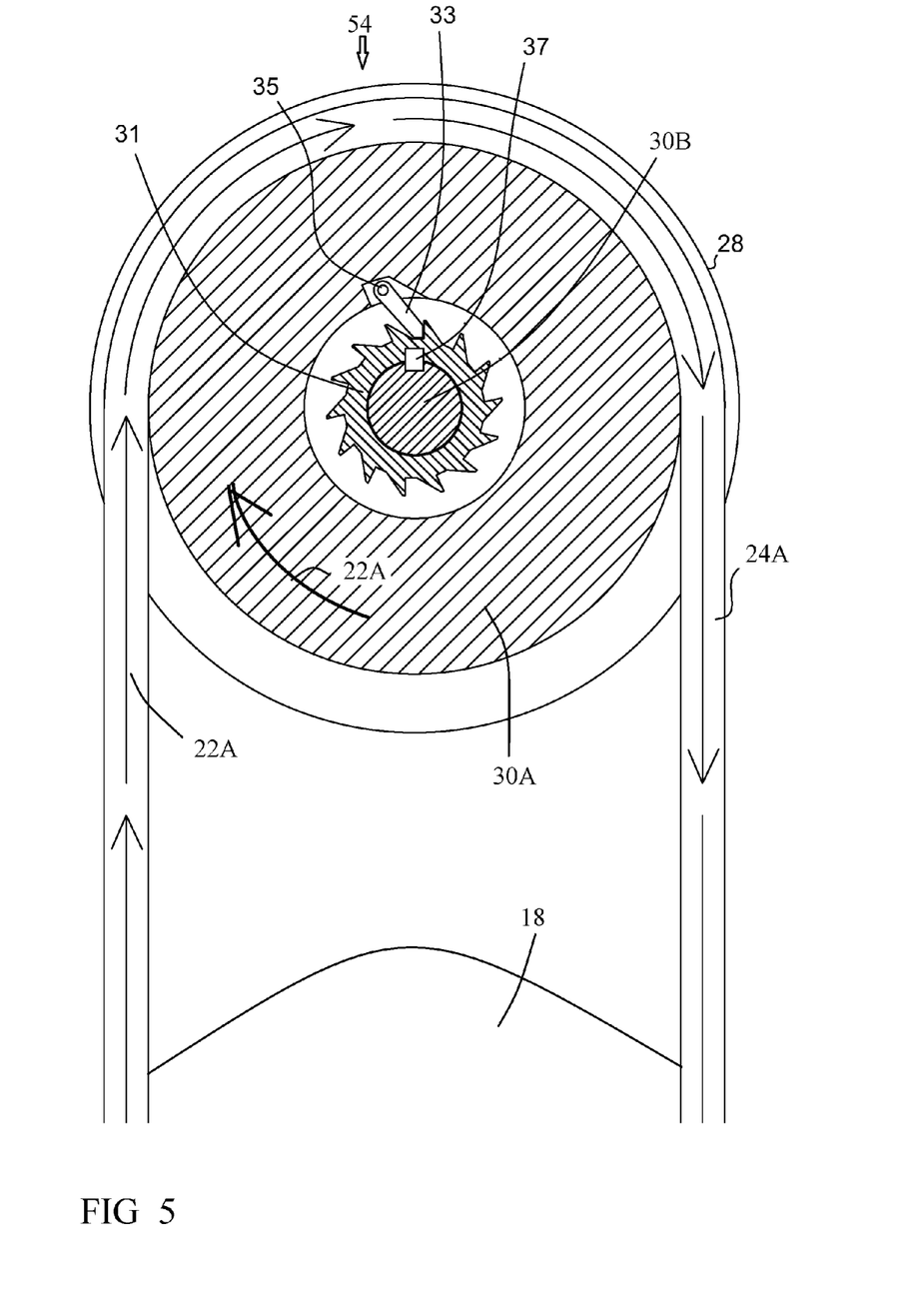
FIG. 5 describes the one-directional bearing of FIG. 4, regarding the rotation of the engine wheel.

FIG. 5 describes the one-directional bearing of FIG. 4, regarding the rotation of the engine wheel.

Engine wheel 18 transmits its torque by belt 24A or other means moving along rotational direction 22A, to wheel 30A of alternator 34.

According to one embodiment, one-directional bearing 54 is applied by rotation 22A of wheel 30A pressing a lever 33 of one-directional bearing 54, which rotates wheel 30B of alternator 34.

Referring again to FIG. 4, wheel 30B rotates air-conditioner wheel 28 through belt 24B along direction 22B.

FIG. 6 depicts the electrical circuitry of the alternator of FIG. 3.

Rotation of wheel 30B of alternator 34 further produces alternating voltage (such as of three phase), being rectified to direct current (DC) supplied to vehicle's battery 66.

Figure 7:
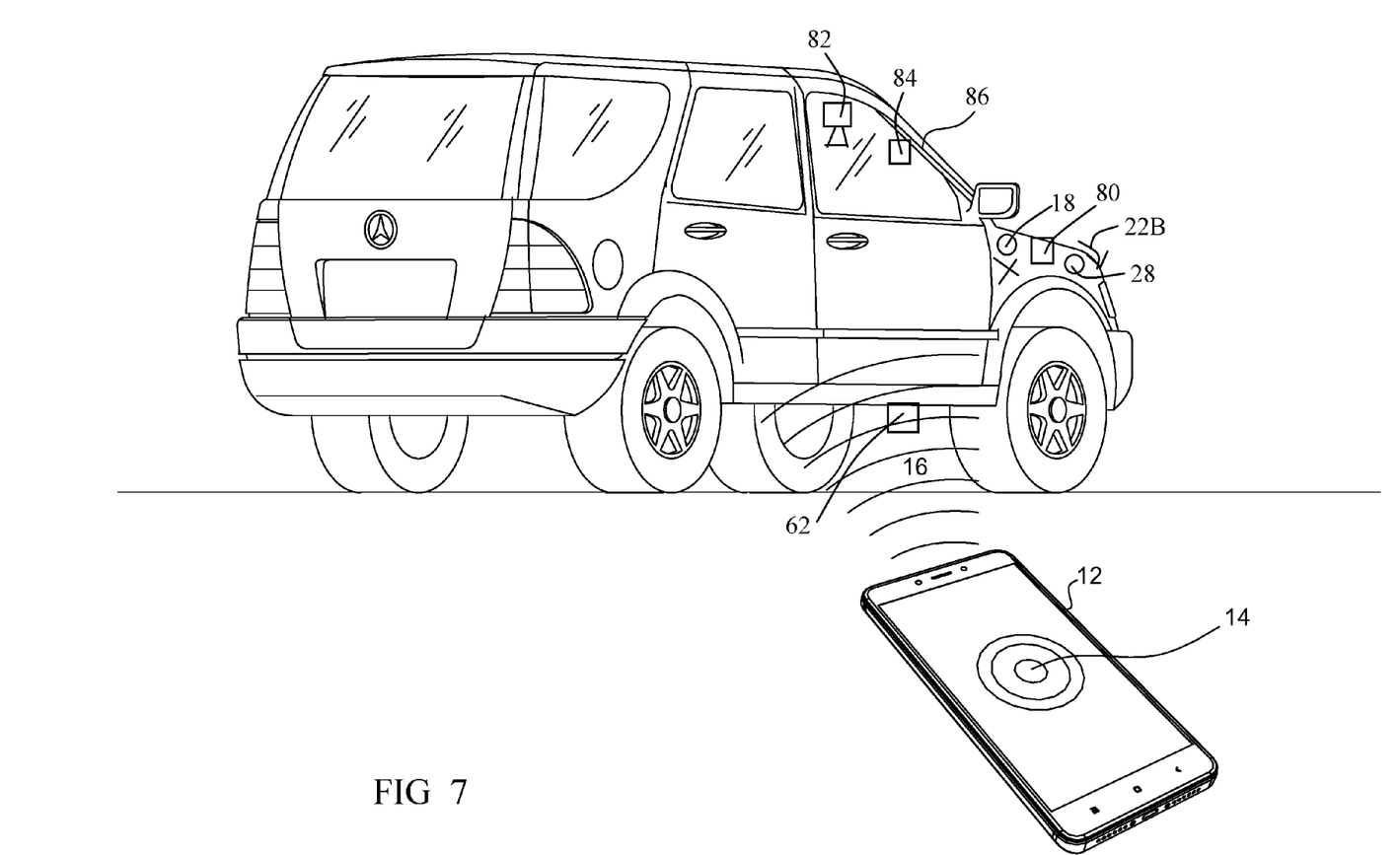
FIG. 7 depicts an operation according to one embodiment of the invention.

FIG. 7 depicts an operation according to one embodiment of the invention.

While the vehicle's engine is off, i.e., engine wheel 18 does not rotate, the user may communicate with an air-conditioning operating element 62, for rotating air-conditioner wheel 28.

The passenger compartment may have a camera 82 and a temperature sensor 84, readings thereof for being communicated to the transmitting device 12.

Thus, the user may leave an infant in the vehicle while parking, turn on the air-conditioner as a function of the indoor temperature, and watch the infant.

The term "DC to AC inverter" is a device that inverts direct current (DC) to alternating current (AC).

Referring again to FIG. 6, air-conditioning operating element 62 operates a DC-to-AC inverter 60.

Operation of DC to AC inverter 60 inverts DC current supplied by battery 68, to AC current supplied to alternator 34, as depicted by schematic alternating switch 72, thus turning alternator 34 to an electric motor, for rotating wheel 30B thereof.

Figure 8:
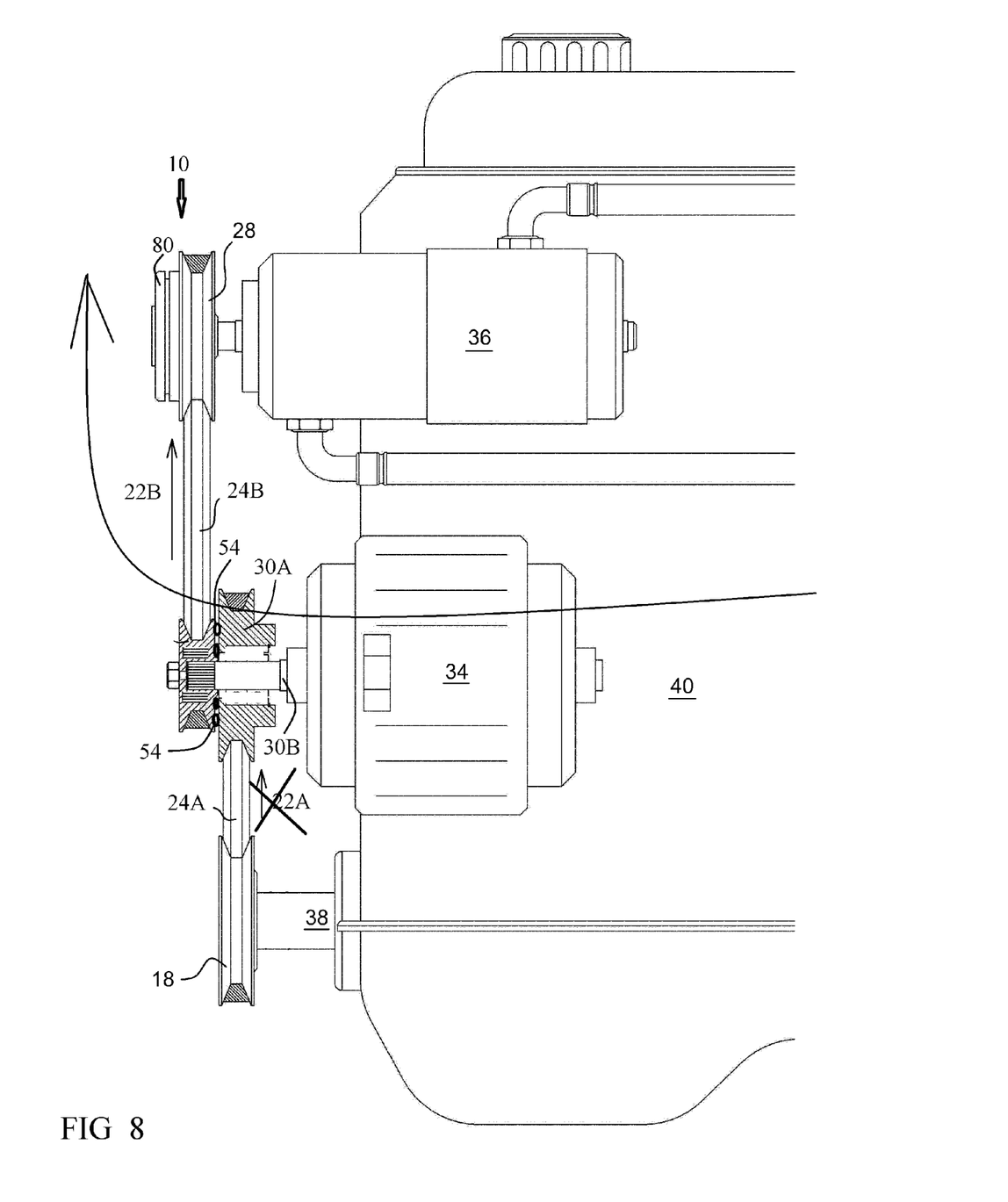
FIG. 8 is a front view of the elements of FIG. 3, for depicting the torque transfer therebetween, in case the source of the power is the battery of FIG. 6, as controlled in FIG. 7.

FIG. 8 is a front view of the elements of FIG. 3, for depicting the torque transfer therebetween, in case the source of the power is the battery of FIG. 6, as controlled in FIG. 7.

Wheel 30B of alternator 34 rotates in rotational direction 22B.

As described in FIG. 3, air-conditioner wheel 28 directly receives its torque from wheel 30B of alternator 34 through belt 24B, along rotational direction 22B, thus operating the air-conditioner, for cooling the passenger's compartment.

However, one-directional bearing 54, provides that rotation of wheel 30B along rotational direction 22B does not rotate wheel 30A along rotational direction 22A, thus not rotating engine wheel 18.

Figure 9:
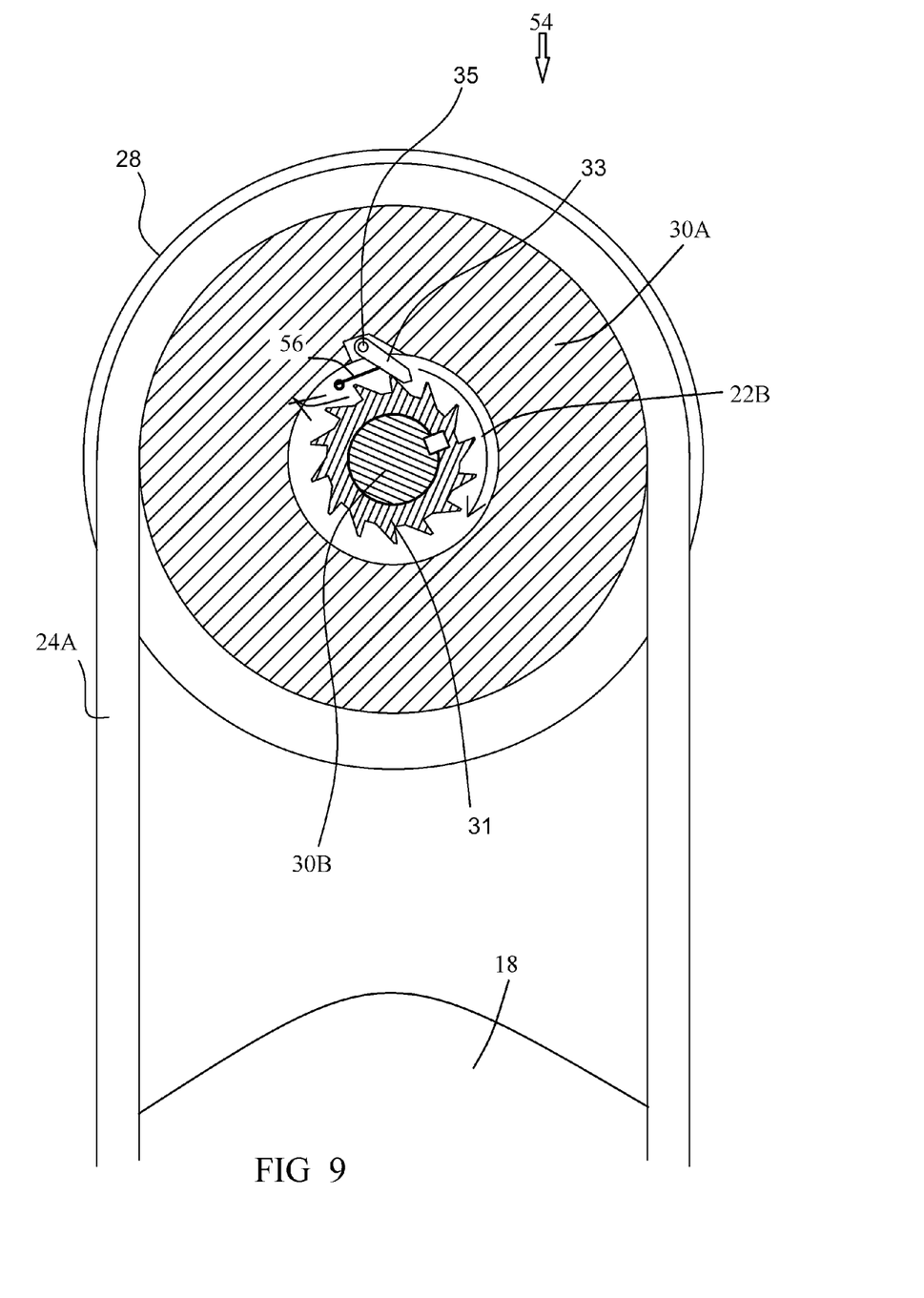
FIG. 9 describes the one-directional bearing of FIG. 4 and FIG. 8, regarding the rotation of the engine wheel.

FIG. 9 describes the one-directional bearing of FIG. 4 and FIG. 8, regarding the rotation of the engine wheel.

Wheel 30B of alternator 34 and wheel 30A are connected one to the other through one-directional bearing 54.

According to one embodiment, wheel 30B rotating along rotational direction 22B presses lever 33 of one-directional bearing 54 against spring 56 thereof, thus not applying any pressure on wheel 30A, thus not rotating engine wheel 18.

Thus, in one aspect, the invention is directed to a vehicle air-conditioning system (10), including a DC-to-AC inverter (60), for supplying alternating current to the alternator (34) of the vehicle (86) from a battery (66, 68), for rotating the wheel (32B) of the alternator (34) and a mechanical connection (24B, 80) between the alternator wheel (32B) and a wheel (28) of the air-conditioner (36) of the vehicle (86), the mechanical connection (24B, 80) being separable from the engine wheel (18), thereby allowing operating the air-conditioner (36) separated from the engine wheel (18).

The vehicle air-conditioning system (10) may further include a one-directional bearing (54), for transferring the rotation of the engine wheel (18) to the alternator wheel (32B) and not vice versa, thereby powering of the air-conditioner wheel (28) by the battery (66, 68) does not rotate the engine wheel (18), even though allowing powering of the air-conditioner wheel (28) by the engine wheel (18).

The mechanical connection (24B, 80) between the alternator wheel (32B) and the air-conditioner wheel (28) may be applied by a first belt (24B), and the connection to the engine wheel (18) may be applied by a second belt (24A), thereby separating the connections one from the other.

The battery (66, 68) rotating the alternator wheel (32B) may be additional to the main battery (66) igniting the vehicle (86).

The alternator (34) may be electrically connected both to the battery (66, 68) rotating the alternator wheel (32B) and to the battery (66) igniting the vehicle (86), for recharging both.

The vehicle air-conditioning system (10) may further include a transmitting device (12), for communicating with the operating element (62), thereby wirelessly (16) operating the air-conditioner (36).

The operation of the air-conditioner (36) separated from the engine wheel (18) allows turning off the vehicle's engine (38) including the engine wheel (18), for allowing safe leaving of an infant in the vehicle while parking.

The engine (38) including the engine wheel (18), may be an internal combustion engine and an electric engine.

In the figures and/or description herein, the following reference numerals (Reference Signs List) have been mentioned:

numeral 10 denotes the vehicle air-conditioning system according to one embodiment of the invention;

numeral 12 denotes the transmitting device, such as a smartphone;

numeral 14 denotes an operating button in the application;

numeral 16 denotes wireless communication;

numerals 20A, 20B and 20C denote wheels connected to connection 24A of engine wheel 18, such as wheels of the vehicle's water pump being rotated by engine wheel 18;

numeral 22A denotes movement of elements of mechanical connection 24A;

numeral 22B denotes movement of elements of mechanical connection 24B;

numeral 24A denotes a belt or another mechanical connection including engine wheel 18;

numeral 24B denotes a belt or another mechanical connection including alternator wheel 30B and air-conditioner wheel 28;

numeral 28 denotes the air-conditioner wheel;

numeral 30A denotes a wheel being connected to belt 24A;

numeral 30B denotes the alternator wheel;

numeral 31 denotes a one-directional cog of one-directional bearing 54, being fixed to wheel 30B;

numeral 33 denotes a rotatable lever;

numeral 34 denotes the alternator, for producing electric power for recharging the battery;

numeral 35 denotes a hinge of rotatable lever 33;

numeral 36 denotes the vehicle's air-conditioner;

numeral 37 denotes a fixing of one-directional cog 31 to wheel 30B;

numeral 38 denotes the vehicle's engine;

numeral 40 denotes the engine system;

numeral 54 denotes the one-directional bearing, for connecting between wheels 30A and 30B and for releasing therebetween;

numeral 56 denotes a spring for pulling the rotatable lever onto one-directional cog 31;

numeral 60 denotes the DC-to-AC inverter;

numeral 62 denotes the air-conditioning operating element;

numeral 64 denotes an electric separator, for separating main battery 66 from air-conditioning battery 68, even though being parallel connected therebetween; the separation is responsible for charging main battery 66 first, and for not consuming therefrom to air conditioning;

numeral 66 denotes the vehicle's main battery, functioning for igniting the vehicle, and for other functions;

numeral 68 denotes a battery designated for air-conditioner 36; the battery should allow several minutes of operation only, until the user arrives and turns on engine 38;

numeral 70 denotes a rectifier;

numeral 72 is a schematic alternating switch, for alternately switching between the DC electrical lines 74A and 74B, and the AC electrical lines 90A, 90B, and 90C;

numerals 74A and 74B denote DC input and output electrical lines;

numeral 80 denotes a mechanical connection, such as a clutch, between air-conditioner wheel 28 and air-conditioner 36, for applying the cooling; connection 80 is active once the user manually turns on air-conditioner 36, either by pressing a button in the passenger's compartment while the engine is on, or via transmitting device 12 while the engine is off;

numeral 82 denotes a camera;

numeral 84 denotes a temperature sensor;

numeral 86 denotes the vehicle; and numerals 90A, 90B and 90C denote AC input and output electrical lines, such as of three phase.

The foregoing description and illustrations of the embodiments of the invention have been presented for the purpose of illustration, and are not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. An air-conditioning system for a vehicle having a battery, the air-conditioning system comprising:
    a DC-to-AC inverter, for selectively supplying alternating current from the battery to an alternator of said vehicle;
    a first belt engageably extending between a first wheel of the alternator and a wheel of an air conditioner, wherein selectively supplying alternating current from the battery to the alternator produces rotation of the first wheel of the alternator and the wheel of the air conditioner in a first direction;
    a second belt engageably extending between a second wheel of the alternator and an engine wheel, wherein rotation of the engine produces rotation of the engine wheel and the second wheel of the alternator in a second direction; and
    a one-directional bearing operably engaging the first wheel of the alternator with the second wheel of the alternator in the second direction, the one-directional bearing thereby enabling transfer of the rotation of an engine wheel to the first and second wheel of the alternator in the second rotational direction, and wherein the one-directional bearing further enables rotation of the first wheel of the alternator in the first rotational direction without producing rotational motion of the second wheel of the alternator.

2. The air-conditioning system according to claim 1, wherein a mechanical connection between said first wheel of the alternator and said wheel of the air-conditioner comprises the first belt, and wherein a connection between the first wheel of the alternator and said engine wheel comprises the second belt.

3. The air-conditioning system according to claim 1, wherein said battery for rotating said first wheel of the alternator is an additional battery to a battery igniting said vehicle.

4. The air-conditioning system according to claim 3, wherein said alternator is electrically connected to said battery for rotating said first wheel of the alternator and to said battery igniting said vehicle, for recharging both batteries thereof.

5. The air-conditioning system according to claim 1, further comprising:
    a transmitting device, for communicating with an operating element, thereby wirelessly operating said air-conditioner.

6. The air-conditioning system according to claim 1, wherein the allowing of the powering of said wheel of the air-conditioner by said battery without rotating said engine wheel allows turning off an engine comprising said engine wheel.

7. The air-conditioning system according to claim 1, wherein an engine comprising said engine wheel, consists of a member selected from a group including: an internal combustion engine, and an electric engine.

* * * * *